June 23, 1964
H. J. BRETTRAGER
3,138,179
SAW MILL
Filed Jan. 17, 1961
4 Sheets-Sheet 1
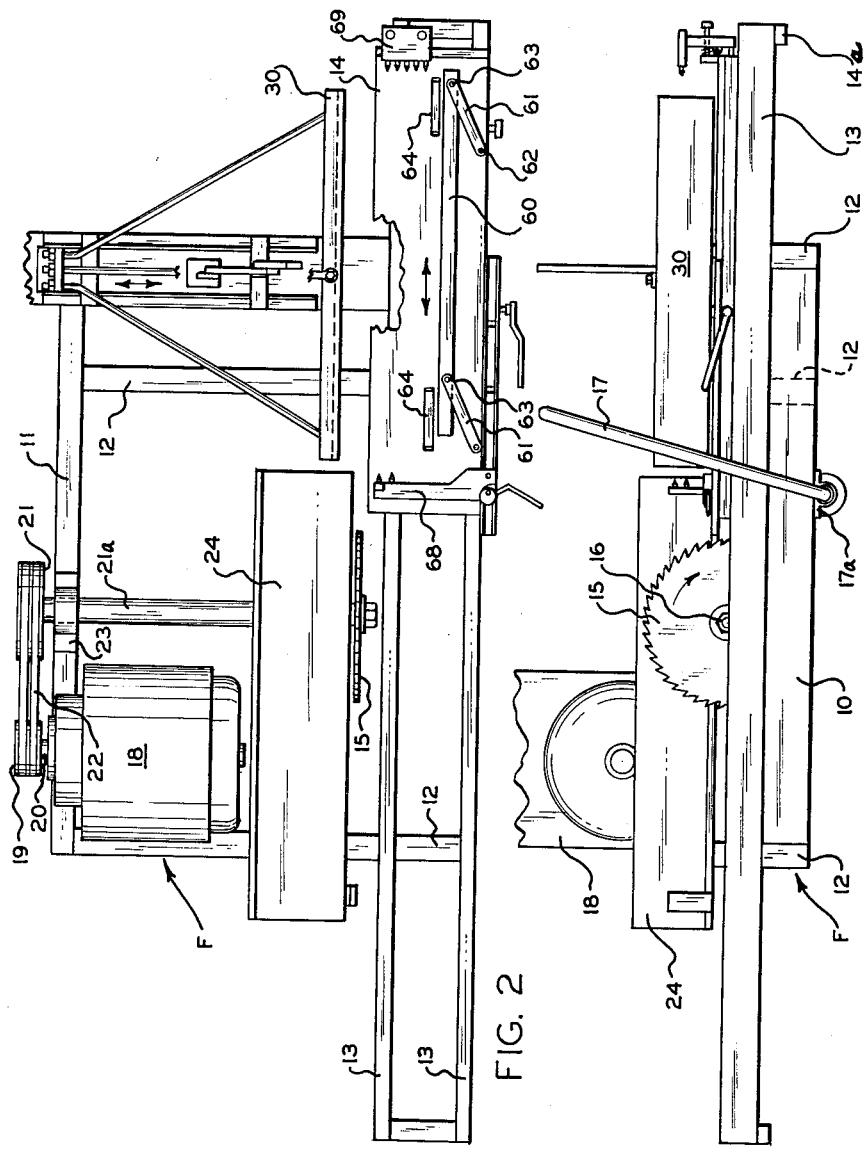
INVENTOR.
HENRY J. BRETTRAGER
BY
ATTORNEYS June 23, 1964 H. J. BRETTRAGER 3,138,179
SAW MILL
Filed Jan. 17, 1961 4 Sheets-Sheet 2
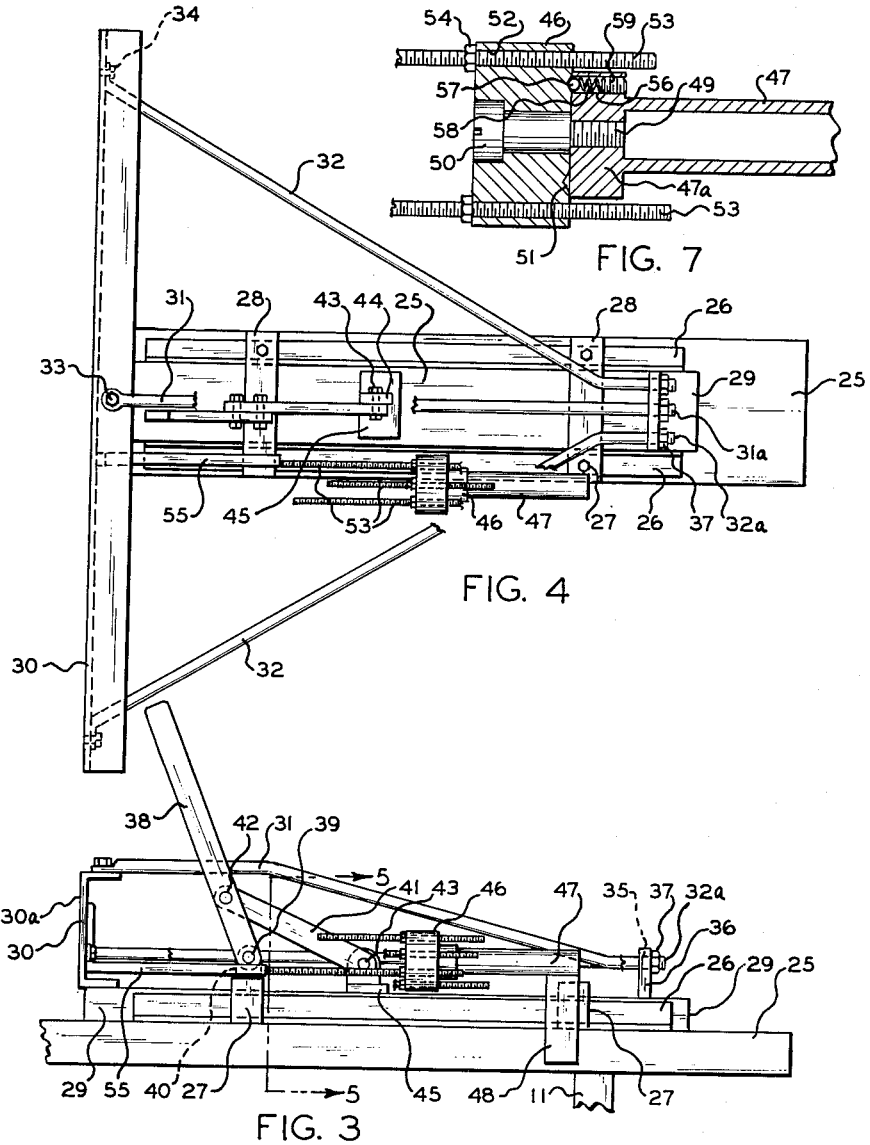
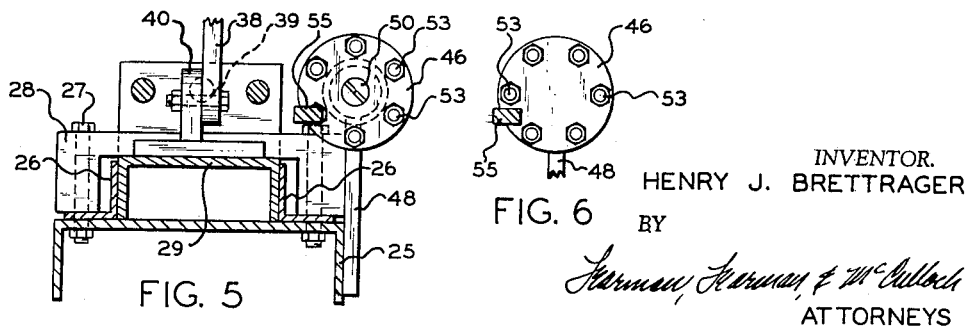
INVENTOR.
HENRY J. BRETTRAGER
BY
ATTORNEYS June 23, 1964  H. J. BRETTRAGER  3,138,179
SAW MILL
Filed Jan. 17, 1961  4 Sheets-Sheet 3
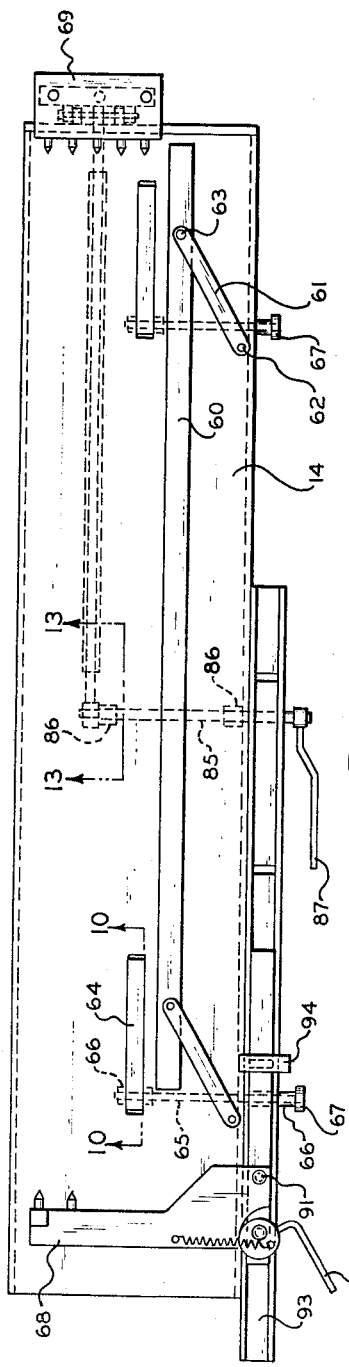
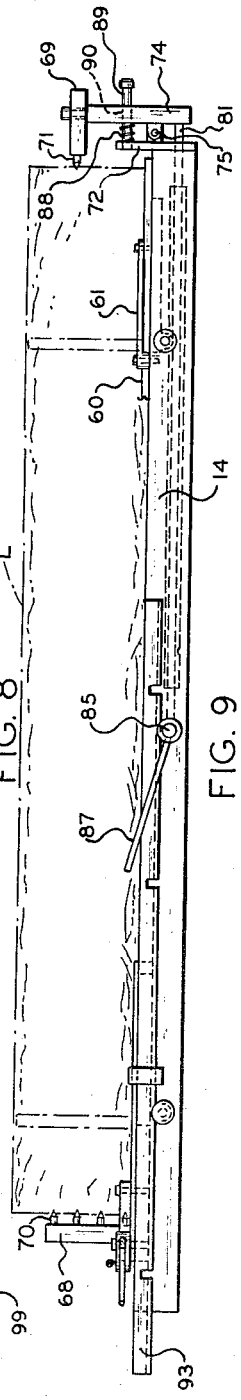
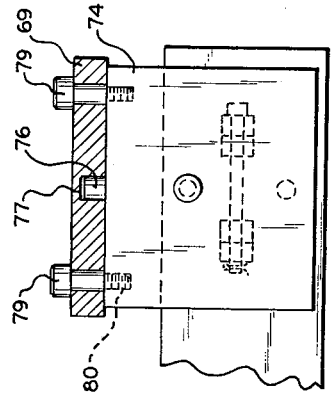
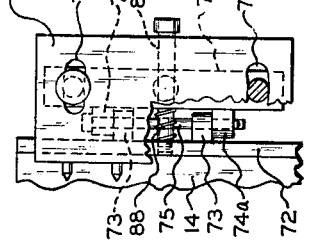
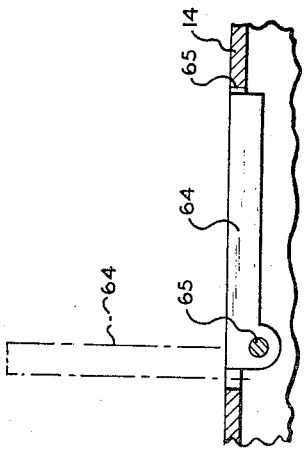
FIG. 8
FIG. 9
FIG. 10
FIG. 11
FIG. 12
INVENTOR.
HENRY J. BRETTRAGER
BY
ATTORNEYS June 23, 1964　　　H. J. BRETTRAGER　　　3,138,179
SAW MILL Filed Jan. 17, 1961　　　　　　　　　　　4 Sheets-Sheet 4

INVENTOR.
HENRY J. BRETTRAGER
BY
ATTORNEYS

United States Patent Office 3,138,179
Patented June 23, 1964

3,138,179
SAW MILL
Henry J. Brettrager, 5410 East St., Saginaw, Mich.
Filed Jan. 17, 1961, Ser. No. 83,214
8 Claims. (Cl. 143—117)

This invention relates to saw mills and more particularly to certain novel and useful improvements in light, portable saw mills of the type designed for small scale operations.

An important object of the invention is to provide quickly settable means for reliably gauging the width of material or slab to be removed from the log or length of wood being cut.

A further object of the invention is to provide, as a safety measure, readily engageable and releasable means for clamping the ends of the log or length of wood on the table and holding the log in position on the table as the saw moves through the log.

Another object of the invention is to design a saw mill that is effiicient in operation, readily maneuverable, and will rapidly cut logs into railroad ties, construction lumber, and like products.

Another important object of the invention is to provide a saw mill of the character described which incorporates readily movable means for assisting the operator in maintaining the parallelism of opposite sides of a slab which is to be cut, and means which can be used to slab two opposite sides of an otherwise unfinished log and maintain the sides in parallelism so that the product can be used as a railroad tie.

Still a further object of the invention is to provide a highly efficient saw mill which can be economically manufactured and assembled, and may be sold to individuals or small groups for small scale lumbering operations.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

FIGURE 1 is a side elevational view of the saw mill;

FIGURE 2 is a top plan view thereof;

FIGURE 3 is an enlarged, end elevational view, taken from the right end of the mill shown in FIGURES 1 and 2 to show the transversely movable guide particularly and omitting certain of the parts of the mill in the interest of clarity;

FIGURE 4 is a top plan view of the transversely movable guide illustrated particularly in FIGURE 3;

FIGURE 5 is a further enlarged, fragmentary, sectional view taken on the line 5—5 of FIGURE 3 with the position gauging elements for the transversely movable guide in operative engagement;

FIGURE 6 is a similar view of the position gauging elements only, with the positioner bar in inoperative position between the gauging rods;

FIGURE 7 is a still further enlarged, longitudinal, sectional view through the rotatable gauging rod mechanism;

FIGURE 8 is an enlarged, top plan view of the table for moving the log or length of wood relatively to the saw;

FIGURE 9 is a side elevational view thereof with the diagrammatic lines indicating the "up" position of the rotatable members used when cutting railroad ties having but two flat faces;

FIGURE 10 is an enlarged, sectional, elevational view taken on the line 10—10 of FIGURE 8 with the diagrammatic lines similarly indicating the raised position of a rotatable member;

FIGURE 11 is an enlarged, fragmentary, top plan view of the log clamping mechanism at one end of the table;

FIGURE 12 is a transverse, sectional view of this mechanism;

Figure 13:
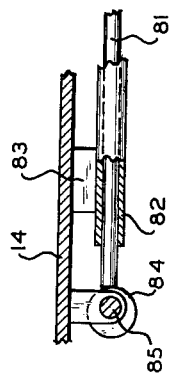
FIGURE 13 is an enlarged, sectional, elevational view taken on the line 13—13 of FIGURE 8 showing actuating means for the log clamping mechanism illustrated in FIGURES 11 and 12.

Referring now more particularly to the accompanying drawings, wherein I have shown a preferred embodiment of the invention only, a letter F generally designates the frame of my saw mill which may be mounted on a trailer so that it is readily portable to various locations in the forest or may be mounted on table legs or the like, as desired. As shown, the frame includes front and rear side members 10 and 11 joined by transversely extending members 12 which support longitudinally extending ways or guide rails 13. The ways 13 are connected by cross members 14a, and mounted on the ways 13 for longitudinal movement thereon is a longitudinally extending table 14 which has longitudinal movement relative to the circular saw blade 15 mounted, as shown, on shaft 16.

The table 14 may be reciprocated longitudinally in any conventional manner. However, preferably a cable and pulley assembly is provided and is actuated by the operating handle 17 which, as shown, is supported by the bearing 17a mounted on front frame member 10. The table or carriage 14 may be driven by means of the system disclosed in Davis Patent No. 2,543,278, and can be connected to the internal combustion engine 18 which also drives saw 15. In FIGURE 2 pulley 19 is shown mounted on the engine shaft 20 which is connected to a drive pulley 21 mounted on a shaft 21a by belts 22. The shaft 21a, which is journaled in a bearing 23 on rear frame member 11, is journaled at its front end in a clutch and gear box 24, and output shaft 16 is similarly journaled in the clutch and gear reduction box 24.

Mounted on extending portions of frame members 10 and 11 is a support channel member 25 forming a stationary part of frame F. Spaced apart angle members 26 are bolted to the channel member 25 by bolts 27, which extend through U-shaped slide retainer members 28, to form a way for a transversely shiftable slide bar member 29 on which a longitudinally extending, channel-shaped long guide 30 is fixed. A central brace rod 31 (FIGURES 3 and 4) and side brace rods 32 are fixed to the guide 30 by bolts 33 and 34, respectively, and have threaded rear end portions 31a and 32a, respectively, extending through openings 35 provided in a rear plate 36 on slide bar 29, nuts 37 being employed to tension the brace rods 31 and 32 slightly to maintain the plumb of the vertical guide face 30a of guide 30.

To shift the guide bar 29, and accordingly guide face 30a, forwardly and rearwardly, a lever 38 is pivotally mounted as at 39 on a bearing block 40 fixed on the front retainer member 28. A link 41, pivotally connected as at 42 to the lever 38 near the lower end thereof to obtain a good mechanical advantage, is also pivotally connected as at 43 to a bearing plate 44 fixed to a block 45 on slide bar 29. Plainly, when the lever 38 is pivoted in a counterclockwise direction, slide bar 29 will be moved forwardly and, when lever 38 is moved in a clockwise direction, bar 29 will be returned rearwardly.

In order to automatically gauge the position of guide 30 so that it may be returned to one of a plurality of selected positions, a rotatable gauging head 46 is provided journaled on a stationary shaft 47 which is fixed by a bracket 48 (FIGURE 3) to one side of frame channel 25. Threaded in the front end of member 47, as at 49, is the shaft 50 (FIGURES 5 and 7) on which revolving member 46 is rotatable. It will be seen that the rear face of revolvable member 46 is provided with circumferentially spaced depressions 51 and the function of these depressions will later become apparent.

The revolvable member 46 has threaded passages 52 at circumferentially spaced intervals receiving threaded rod members 53 which, as shown in FIGURE 4, project different distances forwardly from revolvable member 46. Nuts 54 fix the threaded members 53 in adjusted position. A rearwardly projecting, positioning bar 55, which is fixed at its front end to guide channel 30, is disposed in a position relative to revolvable member 46 such that it will engage the forwardly extending rod 53 which has been rotated to a selected angular position in transverse alignment with bar 55, as shown in FIGURE 5. Since each of the threaded rods 53 extends forwardly a different distance, each may be selectively rotated to a position behind bar 55, which will automatically gauge the position of guide 30 relative to saw 15 and determine the amount of material to be removed by the saw 15.

The notches 51 in the rear face of revolvable member 46 are so positioned that, when one of the rods 53 is in an angular position behind guide bar 55, one of the notches 51 is in alignment with a passage 56 (FIGURE 7) in the head portion 47a of shaft 47 and a ball member 57, urged outwardly by a spring 58, will frictionally maintain the rotatable member 46 in angularly adjusted position. The force exerted by spring 58 is adjusted with a set screw member 59 which threads into the passage 56. When free movement of the slide bar 29 in guides 26 is desired, the rotatable member 46 can be revolved to such a position that guide bar 55 is disposed between the gauging rods 53, as shown in FIGURE 6.

Mounted transversely opposite the guide 30 on the table 14 is a guide bar 60 (FIGURE 2) which is, regardless of its transverse position, at all times in parallelism with guide 30 and the plane of saw 15. Parallel links 61 pivotally connected to the table 14 at 62 and to the ends of bar 60 as at 63 function to maintain bar 60 parallel with guide 30.

Also parallel with guide 30 and the plane of saw 15 are rotatable guide bars 64 which, in "down" position, as indicated in FIGURE 10, are disposed within the slots 65 provided for them in the channel member 14 below the level of the top surface thereof. As indicated particularly in FIGURES 8 and 10, the bars 64 are fixed on transversely extending shafts 65 which are journaled in bearings 66 depending from table 14 and have actuating knobs 67 mounted fast on the other end thereof. Turning of the shafts 65 in a counterclockwise direction in FIGURES 8 and 9 will rotate bars 64 through 90° to the upright position indicated by the diagrammatic lines in FIGURE 10.

Table 14 also mounts left and right log clamping members or plates 68 and 69 which have projecting spike members 70 and 71, respectively, adapted to penetrate the ends of the log L (FIGURE 9) and securely clamp it in position so that it need not be held with the hands when table 14 is moved from its initial position at the right of saw 15 to a position beyond saw 15.

The table 14 is provided with an end plate 72 at its right end from which spaced apart bearings 73 (FIGURE 11) project. The vertical plate 74 on which the clamp plate 69 is mounted is also provided with projecting bearings 74a, and the openings in the bearings 73 and 74a receive the pivot pin 75 which mounts the plate 74 for rocking movement longitudinally. At its upper end, plate 74 carries a pivot pin or post 76 (FIGURE 12) which is received within a bore 77 provided in the clamp plate 69, and plate 69 further has elongate, arcuate openings 78, as shown in FIGURE 11, through which screws 79 extend into threaded openings 80 provided in the vertical plate 74. The bolts 79 are not secured so tightly that clamp plate 69 cannot, if necessary, pivot laterally within the confines of slots 78 about post 76, and thus clamp plate 69 may have a limited rocking movement in a horizontal plane.

At its lower end, plate 74 is engaged by a slide shaft 81 which is journaled in a sleeve 82 (FIGURES 9 and 13) fixed under table 14 on block members 83. The shaft 81 is engaged at its inner or left end by a cam 84 fixed on a shaft 85 supported by bearings 86 depending from table 14 and, as shown in FIGURE 8, an operating handle 87 is mounted on the extending front end of shaft 85. When the handle 87 in FIGURE 9 is turned in a clockwise direction, the cam 84 is rotated to move slide shaft 81 outwardly and rock plate 74 about pivot 75 to force spike members 71 on clamp plate 69 into the end of a log on table 14. To return clamp plate 69 and slide rod 81 once handle 87 is restored to initial position, a spring 88 is mounted on a pin 89 fixed to plate 72 and extending freely through an opening 90 provided in the plate member 74.

Figure 15:
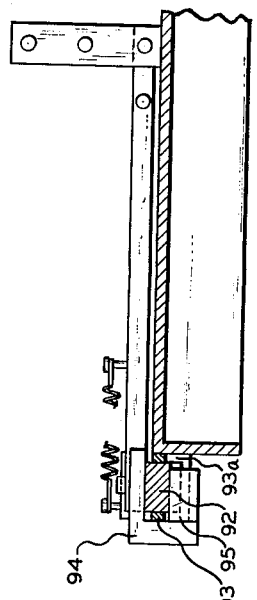
FIGURE 15 is a fragmentary, transverse, sectional view taken on the line 15—15 of FIGURE 16.
Figure 16:
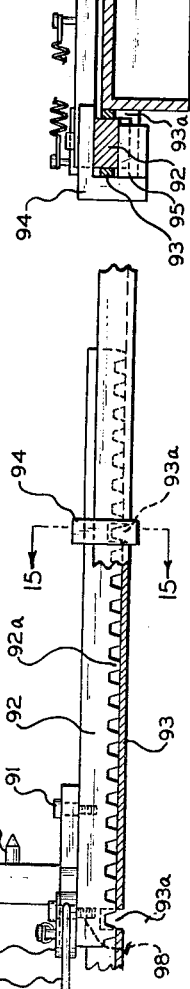
FIGURE 16 is a partly sectional, enlarged, fragmentary, front elevational view of the mechanism shown in FIGURE 14.

Clamp plate 69 is, as noted, operated in conjunction with clamp plate 68 which is pivoted at one corner, as at 91, to a rack bar member 92 received within a guide track 93 fixed to the front edge of table 14. As FIGURE 16 indicates, the lower surface of rack bar 92 is toothed as at 92a and rides along the bottom face of channel track 93. Openings 93a provided at longitudinally spaced intervals in the track 93, which fixes to table 14, permit a keeper 94 (FIGURES 15 and 16), having a toothed member 95 forming the lower leg thereof, to be slid inwardly into one of the notches between rack teeth 92a to hold the rack 92 in a particular position. Likewise, when it is desired to adjust the position of rack 92 longitudinally to clamp a longer or shorter log, keeper 94 is simply slid outwardly or forwardly in FIGURE 15 and rack bar 92 can then be longitudinally adjusted as desired to permit another notch between the rack teeth 92a to align with one of the openings 93a in track channel 93.

Figure 14:
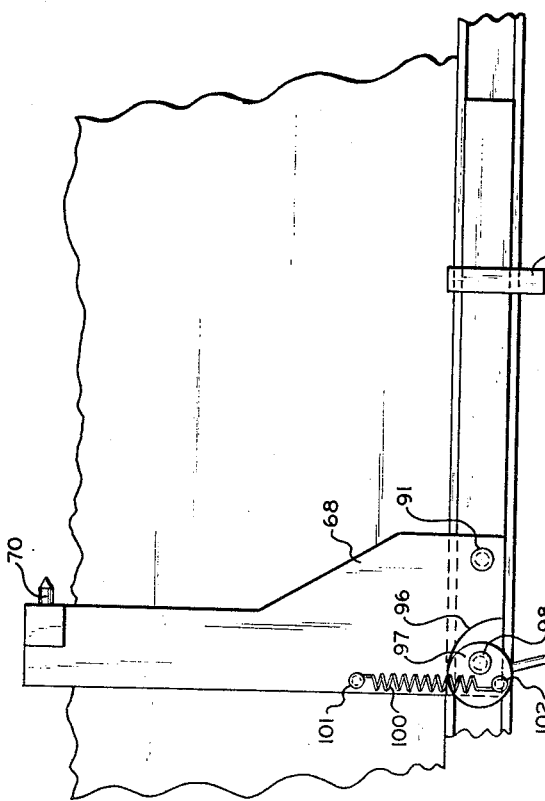
FIGURE 14 is a fragmentary, enlarged, top plan view of the mechanism for clamping the opposite end of the length of log or wood.

The rack bar 92 will only approximately set the left clamp plate 68 in position against the end of a log or the like. Opposite the pivot pin 91 is a cam surface 96 which is engaged by a cam 97 rotatably mounted on a pin 98 threaded into rack bar 92. A crank handle 99 projects peripherally forwardly from the cam 97 and when handle 99 is moved in a clockwise direction in FIGURES 14 and 16, cam 97 revolves about pin 98 to pivot clamp plate 68 inwardly about pivot pin 91 and force projections 70 into locked position in the end of the log. When the cam surfaces 96 and 97 are released from wedged engagement by pulling handle 99 counterclockwisely, a spring 100 mounted between a pin 101 on clamp plate 68 and a pin 102 on cam 97 operates to restore the clamp plate 68 to outward position.

In operation, a log to be cut is placed on the table 14 between the clamp heads 68 and 69 and, with keeper 94 removed, rack bar 92 is slid longitudinally to bring it up to engage the end face of the log, which is disposed in engagement with the projections 71 on plate 69. Keeper 94 is then replaced with its tooth 95 extending through an opening 93a into the nearest notch between teeth 92a (to the opening 93a), which can be aligned with the opening 93a. Handle 87 is then turned clockwisely (FIGURE 9) to force the projections 71 into the right end of the log, with plate 69 being free to rock transversely about pin 76 to align with the end face of the log. Thence, crank handle 99 is moved clockwisely (FIGURE 8) and cam 97 pivots clamp plate 68 about pin 91 to swing it sufficiently that spikes 70 penetrate the left end face of the log and the cam surfaces 96 and 97 lock the clamp plates 68 and 69 in clamped position. Thence, handle 17 can be manipulated to engage the means for moving table 14 longitudinally past the rapidly rotating circular saw 15.

The guide 30 is initially set in a particular position to gauge the amount of material removed from the log, with bar 55 engaging the particular threaded rod 53, which will result in the desired removal of material. To change this setting it is only necessary to rotate revolvable member 46 angularly to move the desired rod 53 to a position in which it will be engaged by the bar 55. Handle 38 is operated to bring the bar 55 into engagement with the particular threaded rod 53. To release the clamped log, once the table 14 has returned to initial position, it is only necessary to revolve lever 99 counterclockwisely to unlock the cam surfaces, whence spring 100 swings clamp plate 68 outwardly about the pin 91. Lever 87 can be simultaneously returned counterclockwisely to permit spring 88 to move the clamp plate 69 outwardly.

When cutting ties in which only two faces are to be flat, a problem arises in making certain that the faces are parallel. In this operation, shafts 65 are revolved to move bars 64 to the vertical position in which they are shown in diagrammatic lines in FIGURES 9 and 10. The one flat face of an otherwise circular log can be supported in facial engagement with the rear faces of bars 64 and thence, when the table 14 is moved past the saw, the flat face remaining when the slab is removed will clearly be parallel to the face engaging member 64.

Bar 60, which is in parallelism with plate 30 at all times, is used when faces at right angles to one another have already been cut on a log. Thus, with one flat side resting on table 14 and the other flat side engaged by bar 60, a slab can be cut from an opposite, uneven side of a log when the table 14 is moved longitudinally to leave a flat side parallel to the side in engagement with bar 60.

It should be apparent that I have perfected a saw mill of novel and practical design which can be purchased and effectively employed by individuals and small groups in small scale lumbering operations. It is to be understood that the drawings and descriptive matter are in all cases to be interpreted as merely illustrative of the principles of the invention rather than as limiting the same in any way.

What is claimed is:

1. Wood cutting apparatus comprising; table means; a vertically disposed saw with a cutting edge longitudinally disposed with said table means; a longitudinally extending guide having a vertical portion extending above said table means on one side of said saw; frame means mounting said guide for movement transversely of said table means; and a series of differently transversely extending stops mounted by one of said frame means and guide and a cooperating member mounted by the other engageable for gauging the transverse position of the guide; said stops on one of said frame means and guide being mounted to be movable to non-engaging position and being spaced apart relative to the member on the other of said frame means and guide so as to receive the member between them.

2. The combination defined in claim 1 in which said frame means includes a rearwardly extending, transversely disposed way; said guide has a slide bar, relatively narrow with respect to the length of said guide received in said way for to and fro movement therein; a block on the rear end of the slide bar; and tension rod members fixed to spaced portions of said vertical portion of the guide including the end portions thereof and having generally converging threaded rear ends extending through said block and clamped thereto.

3. Wood cutting apparatus comprising; longitudinally extending table means; a vertically disposed, circular saw with a cutting edge longitudinally disposed with said table means; means mounting said table means for longitudinal movement relative to said saw; a longitudinally extending guide having a vertical portion extending above, but not connected to said table means, stationary frame means mounting said guide for movement transversely of said table means; a journal on said frame means having a transverse axis; an indexable member received by said journal and having a series of circumferentially spaced, transversely extending, threaded members threaded therein projecting forwardly of said revolvable member different distances; a member mounted by said guide extending rearwardly therefrom of such shape as to be receivable in any one of the spaces between said circumferentially spaced members but disposed in the path of rotation thereof to engage a selected one of said threaded members for positioning the guide; means frictionally, but releasably, retaining said revolvable member in an indexed position in which said selected one of said threaded members engages said member mounted by the guide; and lever means mounted by said frame means and attached to said guide for moving said guide forwardly and rearwardly.

4. Wood cutting apparatus comprising; table means; a vertically disposed circular saw with a cutting edge longitudinally disposed with said table means; means mounting said table means for longitudinal movement relative to said saw; a longitudinally extending guide having a vertical portion extending above, but not connected to, said table means adjacent the rear edge thereof; stationary frame means mounting said guide for movement transversely of said table means; a vertically disposed first plate having wood penetrating projections thereon extending above said table means and mounted by said table means at one end thereof for rocking movement longitudinally about a transverse axis; a longitudinal slide rod carried under said table means in engagement with the lower end of said plate below said axis; a cam engaging the opposite end of said rod revolvable to move said rod and plate; a second plate extending above said table means and cooperable therewith to clamp a length of wood on said table means for movement with said table means; a longitudinally extending track on the front portion of said table means; a rack member pivotally mounting said second plate at the front corner thereof nearest said first plate received by said track for longitudinal movement therein; adjustable tooth means for locking said member in longitudinally adjusted position in said track; wood penetrating projections on said second plate; a cam surface at the opposite front corner of said second plate; cam means mounted by said table means rotatable to engage said cam surface and pivot said second plate into tightly clamped relation with said length of wood, after said first plate has been locked in engagement with said length of wood, and lock it in position; a longitudinally extending guide bar on said table means forwardly of said guide; link means mounting said bar on said table means for movement forwardly and rearwardly in parallelism with said guide; said table means having longiudinally extending recesses in the top thereof opposite said guide; longitudinally extending guide bars received in said recesses; and shaft means connected near one end of each guide bar for revolving said guide bars to vertical position when desired.

5. Wood cutting apparatus comprising; table means; a vertically disposed circular saw with a cutting edge longitudinally disposed with said table means; means mounting said table means for longitudinal movement relative to said saw; a longitudinally extending guide having a vertical portion extending above, but not connected to, said table means adjacent the rear edge thereof; stationary frame means mounting said guide for movement transversely of said table means; a vertically disposed first plate having wood penetrating projections thereon extending above said table means and mounted by said table means at one end thereof for rocking movement longitudinally about a transverse axis; a longitudinal slide rod carried under said table means in engagement with the lower end of said plate below said axis; a cam engaging the opposite end of said rod revolvable to move said rod and plate; a second plate extending above said table means and cooperable therewith to clamp a length of wood on said table means for movement with said table means; a longitudinally extending track on the front portion of said table means; a rack member pivotally mounting said second plate at the front corner thereof nearest said first plate received by said track for longitudinal movement therein; adjustable tooth means for locking said member in longitudinally adjusted position in said track; wood penetrating projections on said second plate; a cam surface at the opposite front corner of said second plate; cam means mounted by said table means rotatable to engage said cam surface and pivot said second plate into tightly clamped relation with said length of wood, after said first plate has been locked in engagement with said length of wood, and lock it in position; a longitudinally extending guide bar on said table means forwardly of said guide; and link means mounting said bar on said table means for movement forwardly and rearwardly in parallelism with said guide.

6. Wood cutting apparatus comprising; table means; a vertically disposed saw with a cutting edge longitudinally disposed with said table means; means mounting said table means for longitudinal movement relative to said saw; a normally vertically disposed plate extending above said table means and pivotally mounted by said table means at one end thereof; a second plate extending above said table means; a longitudinally extending track on the front portion of said table means; a member pivotally mounting said second plate received by said track for longitudinal movement therein; means for locking said member in longitudinally adjusted position in said track; wood engaging projections on at least said second plate; and cam means in engagement with said second plate operative to pivot said second plate toward said first plate into tightly clamped relation with said length of wood and lock it in position.

7. Wood cutting apparatus comprising; table means; a vertically disposed saw with a cutting edge longitudinally disposed with said table means; means for driving said saw; means mounting said table means for longitudinal movement relative to said saw; a first vertically disposed plate extending above said table means and pivotally mounted by said table means; a second plate extending above said table means at a spaced distance from said first plate; reciprocable shaft means mounted by said table means for engagement with one end of said first plate; and manually operated cam means for moving said shaft means and pivoting said first plate in a direction toward said second plate to clamp a length of wood between said plates on said table.

8. Wood cutting apparatus comprising; table means; a vertically disposed saw with a cutting edge longitudinally disposed with said table means; means mounting said table means for longitudinal movement relative to said saw; a vertically disposed first plate having wood engaging projections thereon extending above said table means and mounted by said table means at one end thereof; means mounting said first plate for rocking movement in a longitudinal direction; first cam means for rocking said first plate; a second plate extending above said table means and mounted for longitudinal movement relative thereto to clamp a length of wood between said plates; a longitudinally extending track on the front portion of said table means; a rack member pivotally mounting said second plate received by said track for longitudinal movement therein; toothed means for locking said member in longitudinally adjusted position in said track; wood engaging projections on said second plate; and second cam means mounted by said table means operative to rock said second plate toward said first plate into tightly clamped relation with said length of wood, once said first plate has been operated, and lock it in position.

References Cited in the file of this patent

UNITED STATES PATENTS

| | | |
|---|---|---|
| 556,169 | Tilghman | Mar. 10, 1896 |
| 933,932 | Thomas | Sept. 14, 1909 |
| 1,535,596 | French | Apr. 28, 1925 |
| 1,735,773 | McIlvanie | Nov. 12, 1929 |
| 2,543,278 | Davis | Feb. 27, 1951 |
| 2,582,658 | Tackett | Jan. 15, 1952 |
| 2,673,581 | Dornath et al. | Mar. 30, 1954 |
| 2,741,278 | McMurtrie | Apr. 10, 1956 |
| 2,796,092 | Gresdel | June 18, 1957 |

FOREIGN PATENTS

| | | |
|---|---|---|
| 167,582 | Germany | Feb. 3, 1906 |